United States Patent [19]
Johnson

[11] 3,741,987
[45] June 26, 1973

[54] INTERMEDIATES IN TOTAL SYNTHESIS OF 16-DEHYDROPROGESTERONE
[75] Inventor: William S. Johnson, Portola Valley, Calif.
[73] Assignee: The Board of Trustees of the Leland Stanford Junior University, Stanford, Calif.
[22] Filed: Sept. 9, 1970
[21] Appl. No.: 70,898

Related U.S. Application Data
[63] Continuation-in-part of Ser. No. 788,092, Dec. 30, 1968, Pat. No. 3,598,845.

[30] Foreign Application Priority Data
Dec. 23, 1969 Canada .............................. 070,702

[52] U.S. Cl............ 260/340.9, 260/340.7, 260/397, 260/397.1, 260/397.3, 260/397.5, 260/410.9 R, 260/456 P, 260/468 P, 260/586 H, 260/593 R, 260/611 A, 260/632 B, 260/654 R
[51] Int. Cl............................................. C07d 13/04
[58] Field of Search ..................... 260/340.7, 340.9, 260/593 R, 410.9

[56] References Cited
OTHER PUBLICATIONS
Morrison, et al. Organic Chemistry, 2nd Ed., 1966, pp. 248–249, 466–467 and 937–938, Allyn and Bacon, Inc., Boston.

Primary Examiner—Alex Mazel
Assistant Examiner—James H. Turnipseed
Attorney—Edward B. Gregg

[57] ABSTRACT
dl-Pregna-4,16-diene-3,20-dione (16-dehydroprogesterone) and dl-17-formylandrosta-4,16-diene-3,20-dione are prepared by a series of reactions starting with 1-methylcyclopropyl methyl ketone.

6 Claims, No Drawings

INTERMEDIATES IN TOTAL SYNTHESIS OF 16-DEHYDROPROGESTERONE

This application is a continuation-in-part of application Ser. No. 788,092, filed Dec. 30, 1968, now U.S. Pat. No. 3,598,845.

This invention relates to a new synthesis of dl-pregna-4,16-diene-3,20-dione (16-dehydroprogesterone) and dl-17-formylandrosta-4,16-diene-3,20-dione, and in particular is concerned with novel intermediates and process steps in said synthesis.

The starting material for the synthesis is the known 1-methylcyclopropyl methyl ketone [Julia et al., Bull. Soc. Chim. France, 1381 (1960)]. This compound is treated with a di-lower-alkyl carbonate in the presence of a strong base to give a 1-methylcyclopropyl carbo-lower-alkoxymethyl ketone of the formula

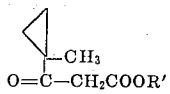

I wherein R' is lower-alkyl having from one to about six carbon atoms. The reaction is carried out under anhydrous conditions in an inert solvent at a temperature between about 50°C. nd 150°C. The strong base can be any anhydrous strong base commonly used in base-catalyzed reactions involving α-substitution of a ketone, for example, an alkali metal hydride, alkali metal lower-alkoxide or alkali metal amide.

The next step comprises treating in the presence of a strong base a compound of formula I with an alkyl halide of the formula CH$_2$=CH(R)CH$_2$—hal, wherein R is hydrogen or methyl and hal is halogen, preferably chlorine or bromine, to produce a compound of the formula

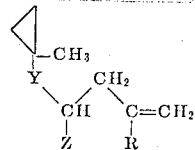

II wherein R is hydrogen or methyl, Y is C=O and Z is carbo-lower-alkoxy. The reaction is carried out under anhydrous conditions in an inert solvent at a temperature between about 25° and 150°C. The strong base can be any anhydrous strong base commonly used in base-catalyzed acetoacetic ester type condensations, for example, an alkali metal hydride, alkali metal lower-alkoxide or alkali metal amide.

A compound of formula II wherein R is hydrogen or methyl, Y is C=O and Z is carbo-lower-alkoxy is then subjected to alkaline hydrolysis and decarboxylation to give a compound of formula II wherein R is hydrogen or methyl, Y is C=O and Z is hydrogen. The hydrolysis and decarboxylation is carried out by heating the keto ester with an aqueous alkali metal or alkaline earth metal hydroxide.

The resulting compound of formula II wherein R is hydrogen or methyl, Y is C=O and Z is hydrogen is then reduced with lithium aluminum hydride to give a carbinol of formula II wherein R is hydrogen or methyl, Y is CH(OH) and Z is hydrogen. The reduction reaction is carried out in an inert solvent at room temperature or below.

The carbinol II [R is hydrogen or methyl, Y is CH(OH) and Z is hydrogen] is then treated first with phosphorus tribromide and then with anhydrous zinc bromide to yield a compound of the formula

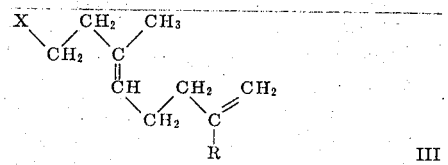

III wherein R is hydrogen or methyl, and X is bromine. The phosphorus tribromide treatment is carried out in an inert solvent at a temperature between about −50°C. and 0°C., preferably in the presence of collidine and lithium bromide. The anhydrous zinc bromide treatment is carried out in an inert solvent at a temperature between about −50°C. and 0°C.

The resulting compound of formula III wherein R is hydrogen or methyl and X is bromine is heated with an anhydrous alkali metal lower-alkanoate in an inert solvent to give a compound of formula III wherein R is a hydrogen or methyl and X is lower-alkanoyloxy. The lower-alkanoyloxy group preferably has from two to four carbon atoms, thus including, for example, acetoxy, propionoxy and butyroxy.

The ester III (R is hydrogen or methyl and X is lower-alkanolyoxy) is next converted to the corresponding alcohol III (R is hydrogen or methyl and X is hydroxy) by conventional hydrolysis procedures, or by treating it with lithium aluminum hydride in an inert solvent.

The alcohol III (R is hydrogen or methyl and X is hydroxy) is then treated with p-toluenesulfonyl chloride in pyridine to give the p-toluenesulfonate ester III (R is hydrogen or methyl and X is p-toluenesulfonyloxy) and the latter then treated with the lithium salt of 4-benzyloxy-1-butyne to give a compound of the formula

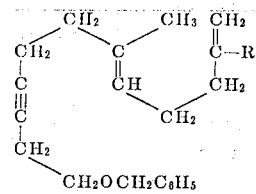

IV wherein R is hydrogen or methyl. The reaction is carried out in an inert solvent under anhydrous conditions at a temperature between about 30°C. and 100°C.

The benzyl ether IV (R is hydrogen or methyl) is then debenzylated and partially reduced by heating it with sodium in liquid ammonia to produce a triene of the formula

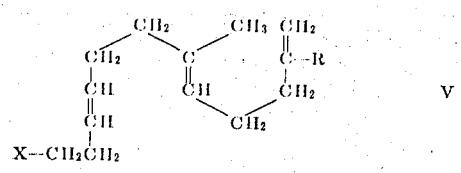

V wherein R is hydrogen or methyl and X is hydroxy.

The hydroxy triene V (R is hydrogen or methyl and X is hydroxy) is treated with p-toluenesulfonyl chloride in pyridine to produce the p-toluenesulfonate ester V (R is hydrogen or methyl and X is p-toluenesulfonyloxy) and the latter treated with lithium bromide in acetone to give the bromo triene V (R is hydrogen or methyl and X is bromine).

In the next step the bromo triene V (R is hydrogen or methyl and X is bromine) is treated with a compound of the formula

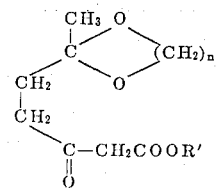

VI wherein R' is lower-alkyl of one to about six carbon atoms and n is 2 or 3, in the presence of a strong base to produce a compound of the formula

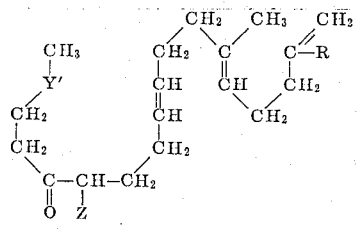

VII wherein R is hydrogen or methyl, Y' is

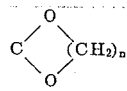

and Z is carbo-lower-alkoxy. The reaction is carried out in an inert solvent under anhydrous conditions at a temperature between about 30°C. and 100°C. The strong base can be any anhydrous strong base commonly used in base-catalyzed acetoacetic ester type condensations, for example, an alkali metal hydride, alkali metal lower-alkoxide or alkali metal amide.

The reactant of formula VI is also novel and is prepared by treating the mono ethylene glycol or propylene glycol ketal of 2,5-hexanedione with a di-lower-alkyl carbonate in the presence of a strong base, for example, sodium hydride.

The keto ester VII (R is hydrogen or methyl, Y' is

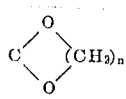

and Z is carbo-lower-alkoxy) is then subjected to alkaline hydrolysis and decarboxylation to give the ketone ketal VII (R is hydrogen or methyl, Y' is

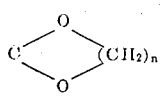

and Z is hydrogen); and the ketal then cleaved by treating it with dilute acid to produce the diketo triene VII (R is hydrogen or methyl, Y' is C=O and Z is hydrogen).

In the next step the diketo triene VII (R is hydrogen or methyl, Y' is C=O and Z is hydrogen) is cyclized by treating it with aqueous basic solution to give a compound of the formula

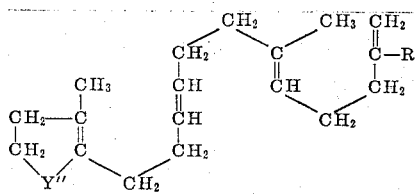

VIII wherein R is hydrogen or methyl and Y'' is C=O. The aqueous basic solution preferably contains an alkali metal hydroxide and the reaction takes place at a temperature between about 50°C. and 150°C.

The keto tetraene VIII (R is hydrogen or methyl and Y'' is C=O) is then treated with methyllithium or with methylmagnesium halide and the reaction mixture hydrolyzed to give the methyl carbinol VIII [R is hydrogen or methyl and Y'' is C(OH)(CH₃)]. The reaction takes place in an inert solvent at ordinary temperatures.

The methyl carbinol VIII [R is hydrogen or methyl and Y'' is C(OH)(CH₃)] is cyclized by treating it with a strong acid to give a tetracyclic compound having the formula

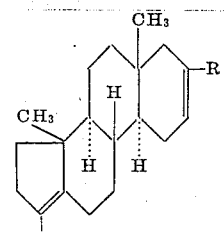

IX wherein R is hydrogen or methyl. The cyclization reaction is preferably carried out at a depressed temperature (−100° − 0°C.), conveniently at the temperature afforded by solid carbon dioxide (about −75°C.). The strong acid can be any strong acid appreciably soluble in the solvent at the temperature employed, for example, a protonic acid such as formic acid, trifluoroacetic acid, fluorosulfonic acid, fluoromethanesulfonic acid, and the like; or a Lewis acid such as stannic chloride, boron trifluoride, aluminum chloride, zinc chloride, and the like; and the solvent is preferably a non-nucleophilic solvent, for example, methylene dichloride, pentane, 1,2-dichloro-1,1,2,2-tetrafluoroethane, and the like.

The cyclization reaction also produces, along with the diene IX, some 17-hydroxy compound of the formula

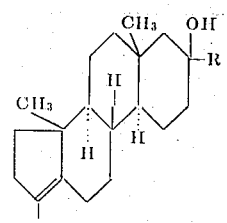

X wherein R is hydrogen or methyl. The compound of formula X where R is methyl can readily be dehydrated with phosphorus oxychloride in pyridine to give the diene IX where R is methyl.

The next step in the synthesis involves cleavage of the tetracyclic diene IX, wherein R is hydrogen or methyl to the tetracarbonyl compound having the formula

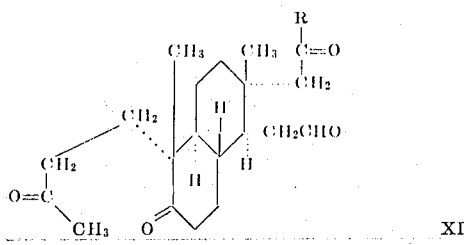

XI wherein R is hydrogen or methyl. The cleavage can be carried out by treating the diene IX with excess osmium tetroxide, followed by cleavage of the bisosmate with hydrogen sulfide to give a tetrol, which is treated with excess lead tetraacetate to yield XI.

Alternatively, the tetracyclic diene IX can be cleaved by ozonolysis. The term "ozonizing" or "ozonolysis" as used herein includes not only the treatment of compound IX with ozone but also the decomposition of the intermediate ozonide. The diene IX in an inert solvent is treated with ozone, preferably at a depressed temperature (−100° – 0°C.), conveniently at the temperature afforded by solid carbon dioxide (about −75°C.). The resulting ozonide is not isolated but is decomposed by procedures known in the art, with reducing agents such as potassium ferro cyanide, sodium hydrosulfide, sulfur dioxide, zinc and acetic acid, and the like. The ozonide decomposition is carried out at room temperature or slightly above, conveniently in the same solvent in which the ozone treatment was performed.

The tetracarbonyl compound XI need not be isolated and purified but can be converted directly to dl-pregna-4,16-diene-3,20-dione (XII, R is methyl) or dl-17-formylandrosta-4,16-diene-3,20-dione (XII, R is hydrogen) by treating the tetracarbonyl compound XI (R is methyl or hydrogen) with a cyclization catalyst.

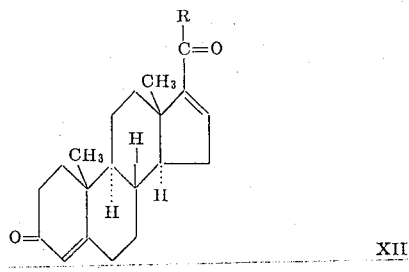

XII

The cyclization catalyst comprises a strong acid (for example, hydrochloric acid, hydrobromic acid, fluoroacetic acid, and the like), a strong base (for example, sodium hydroxide, potassium hydroxide, and the like), an amine (for example, piperidine, triethylamine, and the like) or an amine acid-addition salt (for example, triethylammonium benzoate, triethylammonium acetate, and the like). The cyclization reaction is carried out by heating compound XI with the cyclization catalyst in aqueous or organic medium at a temperature between about 50°C. and 150°C.

The dl-pregna-4,16-diene-3,20-dione (XII, R is methyl) produced as described above is identical in its infrared spectrum, NMR spectrum, mass spectrum, thin layer chromatographic analysis and gas-liquid phase chromatograpic analysis with the corresponding spectra and analyses on d-pregna-4,16-diene-3,20-dione, a known substance derived from naturally occurring steroids (U.S. Pat. No. 2,420,489) and in turn useful in the preparation of progestational and cortical hormones.

The dl-17-formylandrosta-4,16-diene-3,20-dione (XII, R is hydrogen) can readily be converted by known methods [Woodward et al., J. Am. Chem. Soc. 73, 2404, 3547 (1951); Gash et al. U.S. Pat. No. 2,836,621] to dl-17-carboxy-4-androsten-3-one, the optically active form of which has been converted to desoxycorticosterone (Wilds U.S. Pat. No. 2,538,611).

The optically inactive dl-forms of the compounds of formula XII can, if desired, be resolved into their optically active enantiomers by known procedures.

An alternative approach to the synthesis of 16-dehydro-progesterone involves a difference method of conversion of the ketol ester VI to the keto ester VII where R is hydrogen or methyl, Y' is C=O and Z is hydrogen, as follows.

The sodium salt of the keto ester VI is alkylated with 1-iodo-3-butyne to give an acetylenic keto ester of the formula:

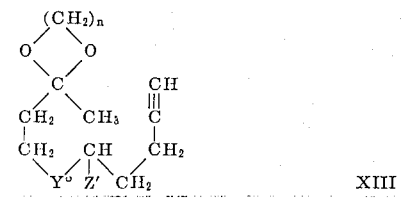

XIII wherein $n$ is 2 or 3, Y° is C=O, and Z' is COOR', R' being lower-alkyl of one to about six carbon atoms. Basic hydrolysis and decarboxylation of the latter gives a keto ketal XIII where Y° is C=O and Z' is hydrogen, which is then ketalized to form an acetylenic diketal wherein Y° is

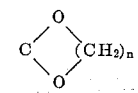

and Z is hydrogen.

The lithio derivative of the acetylenic diketal (XIII; Y° is

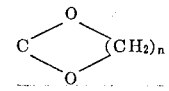

Z is H) is then alkylated with a dienic bromide of the formula

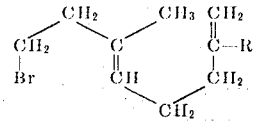

XIV where R is hydrogen or methyl to afford an acetylenic diene diketal of the formula

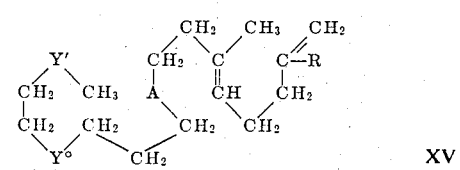

XV wherein Y° and Y' are

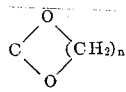

A is C=C and R is hydrogen or methyl. The latter is selectively reduced with sodium in ammonia to give a trienic diketal (XV; Y° and Y' are

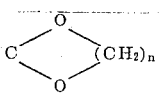

A is CH=CH and R is hydrogen or methyl), and acid hydrolysis then cleaves the ketal groups to give a diketo triene (XV; Y° and Y' are C=O, A is CH=CH and R is hydrogen or methyl) which is identical with the compound of formula VII where Y' is C=O and Z is hydrogen.

The structures of the compounds of the invention, of formulas, I–XV, inclusive, were established by the modes of synthesis, by elementary analysis, by interpretation of their ultraviolet, infrared and nuclear magnetic resonance (nmr) spectra, vapor phase chromatographic analysis (vpc), or by behavior of the compounds in thin layer chromatography (tlc).

The following examples will further illustrate the invention without the latter being limited thereby.

EXAMPLE 1

1-Methylcyclopropyl carbethoxymethyl ketone [I; R' is $C_2H_5$]

A 1.85 g. sample of a 54.7 percent dispersion of sodium hydride in mineral oil was washed with three 10 ml. portions of anhydrous pentane under nitrogen. Then 40 ml. of anhydrous diethyl carbonate was added. This suspension was stirred while a solution of 2.00 g. of 1-acetyl-1-methylcyclopropane, b.p. 127°–129°C. (760 mm.) in 7 ml. of diethyl carbonate containing 4 drops of absolute ethanol was added. After the addition was complete, the mixture was stirred for 15 min. at 25°C., then heated on the steam bath until reaction commenced as indicated by the steady evolution of hydrogen. Gentle heating was continued until gas evolution had ceased (about 1 hr.). The mixture was cooled in an ice bath, and a solution of 2.4 ml. of glacial acetic acid in 20 ml. of ether was added. Water was then added, and the aqueous phase was extracted with ether. The combined organic layers were washed with saturated sodium bicarbonate solution, followed by saturated brine, and dried over anhydrous magnesium sulfate. The residue obtained on evaporation of the solvent at reduced pressure was distilled through a 2 ft. spinning band column to remove the excess diethyl carbonate, b.p. 35°–37°C. (17 mm.). The yellow oily residue was used without purification in the alkylation reaction described below.

A sample of the crude keto ester from another run was purified by chromatography on acid-washed alumina. The fraction eluted with 20 percent ether in pentane was submitted to short-path distillation at 118°–119°C. (15 mm.) to give 1-methylcyclopropyl carbethoxymethyl ketone as a colorless liquid, $n_D^{22}$ 1.4522.

Anal. Calcd. for $C_9H_{14}O_3$: C, 63,51; H, 8.29.
Found: C, 63.2; H, 8.2.

EXAMPLE 2

1-Methylcyclopropyl 1-carbethoxy-3-butenyl ketone [II; R is H, Y is C=O, Z is $COOC_2H_5$]

A 0.90 g. sample of a 54.7 percent dispersion of sodium hydride in mineral oil was washed with three 5 ml. portions of anhydrous pentane under nitrogen; then 20 ml. of anhydrous tetrahydrofuran was added. The suspension was cooled to 0°C and stirred while a solution of the aforementioned crude 1-methylcyclopropyl carbethoxymethyl ketone (Example 1) in 5 ml. of tetrahydrofuran was added over a period of 40 min. The mixture was stirred for 15 min. at 20°–25°C.; then a solution of 2.37 g. of allyl bromide in 10 ml. of tetrahydrofuran was added gradually over a period of 20 min. Toward the end of the addition a white precipitate began to form. The mixture was stirred at 20°–25°C. for 10 hr., then heated at reflux for 1 hr., cooled in an ice bath, treated with 5 ml. of water, and the aqueous layer was extracted with ether. The combined organic layers were washed thoroughly with brine and dried over anhydrous magnesium sulfate. The pale orange residue obtained on removal of the solvent at reduced pressure was employed, without further purification, in the decarboxylation step described below. A sample of comparable material from another run was submitted to short-path distillation at 75°–80°C. (0.10 mm.) to give 1-methylcyclopropyl 1-carbethoxy-3-butenyl ketone as a colorless liquid, $n_D^{24.5}$ 1.4579.

Anal. Calcd. for $C_{12}H_{18}O_3$: C, 68,54; H, 8.63
Found: C, 68.5; H, 8.65.

EXAMPLE 3

1-Methylcyclopropyl 1-carbethoxy-3-methyl-3-butenyl ketone [II; R is $CH_3$, Y is C=O, Z is $COOC_2H_5$]

The procedure (Example 2) described for the alkylation of 1-methylcyclopropyl carbethoxymethyl ketone was modified. The crude keto ester obtained from 2.03 g. of 1-methylcyclopropyl methyl ketone as described above (Example 1) was converted to the sodium enolate with sodium hydride prepared from 0.92 g. of the 54.7 percent dispersion. A total of 30 ml. of tetrahydrofuran was used, and after the addition (30 min.) the solution was stirred for 3 hr. at 25°C. A solution of 2 g. of methallyl chloride in 5 ml. of tetrahydrofuran was added, and the mixture was heated at reflux for 35 hr. At the end of this period a precipitate had formed but the solution was still basic. Therefore, 0.4 g. of anhydrous sodium iodide was added and refluxing continued for an additional 6 hr. The mixture was cooled, water was added, and the aqueous layer was extracted with ether. The combined organic solutions were washed well with brine and dried over anhydrous magnesium sulfate. The pale orange liquid residue obtained on evaporation of the solvent under reduced pressure was used in the next stage of the synthesis without purification. A sample of comparable material from another run was chromatographed on acid-washed alumina. The fraction eluted with pentane to 1 percent ether in pentane was submitted to short-path distillation at 80°–85°C. (0.1 mm.) to give 1-methylcyclopropyl 1-carbethoxy-3-methyl-3-butenyl ketone as a colorless liquid, $n_D^{22}$ 1.4604.

Anal. Calcd. for $C_{13}H_{20}O_3$: C, 69.61; H, 8.99.
Found: C, 69.85; H, 8.9.

In a subsequent larger-scale preparation it was found that when the step involving the alkylation of the β-keto ester was carried out by heating at reflux for a total of 65 hr., the reaction was complete and the addition of sodium iodide was not necessary.

EXAMPLE 4

1-Methylcyclopropyl 3-butenyl ketone [II; R is H, Y is C=O, Z is H]

A mixture of the crude alkylated keto ester of Example 2, 15 ml. of 95 percent ethanol, 40 ml. of water, and 12.7 g. of barium hydroxide octahydrate was heated at reflux for 19 hr. in an atmosphere of nitrogen. The mixture was cooled, poured into 100 ml. of water containing 25 ml. of 10 percent hydrochloric acid overlaid with 100 ml. of ether, and the aqueous layer was extracted with ether. The organic layers were combined and washed with water, saturated sodium bicarbonate solution, followed by saturated brine, and finally dried over anhydrous magnesium sulfate. The oily residue obtained on evaporation of the solvent at reduced pressure was submitted to short-path distillation at 80°–90°C. (18 mm.) to give 2.43 g. of 1-methylcyclopropyl 3-butenyl ketone as a colorless liquid, $n_D^{24}$ 1.4543.

Anal. Calcd. for $C_{19}H_{14}O$: C, 78.21; H, 10.21.
Found: C, 78.4; H, 10.3.

EXAMPLE 5

1-Methylcyclopropyl 3-methyl-3-butenyl ketone [II; R is $CH_3$, Y is C=O, Z is H]

The crude keto ester of Example 3 was saponified and decarboxylated according to the procedure described above (Example 4) for the lower homolog. Short-path distillation of the product at 105°–110°C. (17 mm.) gave 2.78 g. of 1-methylcyclopropyl 3-methyl-3-butenyl ketone as a colorless liquid, $n_D^{22}$ 1.4604.

Anal. Calcd. for $C_{10}H_{16}O$: C, 78.89; H, 10.59.
Found: C, 79.0; H, 10.5.

EXAMPLE 6

1-Methylcyclopropyl-3-butenylcarbinol [II; R is H, Y is CH(OH), Z is

A solution of 0.276 g. of 1-methylcyclopropyl 3-butenyl ketone (Example 4), $n_D^{24}$ 1.4543, in 5 ml. of anhydrous ether was added over a period of 20 min. to a stirred mixture of 0.076 g. of lithium aluminum hydride and 10 ml. of ether. The temperature of the reaction mixture was maintained at 0°C. during the addition and for another hour afterwards. Saturated sodium sulfate solution (0.25 ml.) was added, and the mixture was stirred for 15 min. at 15°–20°C. This mixture was allowed to stand over anhydrous sodium sulfate for 30 min., filtered, and the solvent was removed under reduced pressure to give 0.270 g. of colorless liquid, which was suitable for use in subsequent steps.

A sample of the crude carbinol prepared as described above from 1.9 g. of ketone was submitted to short-path distillation at 110°–120°C. (18mm.) to give 1.86 g. (96 percent yield) of 1-methylcyclopropyl-3-butenylcarbinol as a colorless liquid, $n_D^{23}$ 1.4552.

Anal. Calcd. for $C_9H_{16}O$: C, 77.09; H, 11.50.
Found: C, 77.25; H, 11.5.

EXAMPLE 7

1-Methylcyclopropyl-3-methyl-3-butenylcarbinol [II; R is $CH_3$, Y is CH(OH), Z is H]

A 2.59 g. specimen of the distilled 1-methylcyclopropyl-3-methyl-3-butenyl ketone described in Example 5, $n_D^{22}$ 1,4604, was reduced with lithium aluminum hydride according to the procedure described above in Example 6 for the lower homolog. Short-path distillation of the product at 115°–120°C. (17 mm.) afforded 2.54 g. (97 percent yield) of 1-methylcyclopropyl-3-methyl-3-butenylcarbinol as a colorless liquid, $n_D^{21}$ 1.4606.

Anal. Calcd. for $C_{10}H_{18}O$: C, 77.86; H, 11.76.
Found: C, 77.8; H, 11.75.

EXAMPLE 8 trans-1-Bromo-3-methylocta-3,7-diene [III; R is H, X is Br]

A mixture of 2.66 g. of 1-methylcyclopropyl-3-butenyl-carbinol (Example 6), 1.85 g. of anhydrous collidine, and 3.32 g. of anhydrous lithium bromide in 40 ml. of anhydrous ether was cooled to −40°C. and vigorously stirred while 1.20 ml. of phosphorus tribromide was added over a period of a few min. The mixture was allowed to warm to 0°C., stirring was continued for 1.5 hr., and 2 ml. of collidine was then added, followed by water to destroy the excess phosphorus tribromide. The resulting mixture was poured into water overlaid with pentane, and the aqueous layer was extracted with pentane. The combined organic solutions were washed with water, saturated sodium bicarbonate solution, and brine, and were finally dried over anhydrous magnesium sulfate. The residue (3.2 g.) obtained on evaporation of the solvent at reduced pressure was added slowly with stirring to a cooled (−40°C.) suspension of 3.75 g. of anhydrous zinc bromide in 7 ml. of anhydrous ether. A total of 2.4 ml. of ether was used to aid in the transfer. The reaction mixture was then allowed to warm to 0°C., stirring was continued for 1.5 hr., then pentane and 50 percent saturated brine were added. The aqueous layer was extracted with pentane, and the combined organic layers were washed with brine and dried over anhydrous magnesium sulfate. The pale yellow liquid residue (3 g.) obtained on evaporation of the solvent at reduced pressure was washed through 150 g. of acid-washed alumina with 500 ml. of pentane to give 2.77 g. of trans-1-bromo-3-methylocta-3,7-diene as a colorless liquid, $n_D^{25}$ 1.4870. This product was used in subsequent tranformations without further purification.

Anal. Calcd. for $C_9H_{15}Br$: C, 53.20; H, 7.45; Br, 39.37.
Found: C, 53.6; H, 7.3; Br, 39.1.

The high degree of stereoisomeric purity of this material was indicated by the nmr spectrum which showed absorption for 3 protons as a singlet as $\delta = 1.64$ ppm ($CH_3$, trans C=C), 4 protons as a triplet (J = 3cps) centered at 2.10 (C-5 and -6 methylenes), 2 protons as a triplet (J = 7 cps) centered at 2.51 (C-2 methylene), 2 protons as a triplet (J = 7 cps) centered at 3.37 (C-1 methylene), 3 protons as a set of broad multiplets at 4.75–5.42 (C-4 and -8 vinylprotons), and 1 proton as a multiplet at 5.4–6.1 (C-7 H).

EXAMPLE 9 trans-1-Bromo-3,7-dimethylocta-3,7-diene [III; R is $CH_3$, X is Br]

A mixture of 0.306 g. of the aforementioned 1-methylcyclopropyl-3-methyl-3-butenylcarbinol (Example 7), $n_D^{21}$ 1.4606, 0.2 g. of collidine, 0.59 g. of lithium bromide, and 3 ml. of ether was treated with 0.13 ml. of phosphorus tribromide as described above (Example 8) for the lower homolog. The excess phosphorus tribromide was destroyed by the addition of 0.52 ml. of collidine and 0.5 ml. of water, and the product was isolated as described above to give 0.394 g. of a colorless liquid.

A 0.106 g. sample of the latter liquid was treated with a suspension of 0.124 g. of anhydrous zinc bromide in 0.3 ml. of ether as described above (Example 8) for the lower homolog. The crude product amounted to 0.101 g. of trans-1-bromo-3,7-dimethylocta-3,7-diene as a colorless liquid. The nmr spectrum at 100 Mc showed absorption for 3 protons as a singlet at $\delta = 1.65$ ppm ($CH_3$ at C-3), 3 protons as a singlet at 1.71 ($CH_3$ at C-7), 4 protons as a sharp multiplet centered at 2.01 (C-5 and -6 methylenes), 2 protons as a triplet (J = 7.0 cps) centered at 2.50 (C-2 methylene), 2 protons as a triplet (J = 7.0 cps) centered at 3.37 (C-1 methylene), 2 protons as a broad "singlet" at 4.68 (C-8 methylene), and 1 proton as a broad triplet (J = 6.0 cps) centered at 5.25 (C-4 H).

In a larger scale preparation, a 22.2 g. specimen of the carbinol of Example 7 gave, upon treatment wtih phosphorus tribromide, 28.5 g. (91 percent yield) of bromide mixture. An 11.6 g. sample of this bromide mixture, upon treatment with zinc bromide in ether, gave 10.8 g. (93% yield) of trans-1-bromo-3,7-dimethylocta-3,7-diene.

The crude bromide tends to decompose on standing. When purified as follows, it is considerably more stable. A portion of the crude bromide was dissolved in pentane and filtered through a column of acid-washed alumina. The yellow oily residue obtained on evaporation of the filtrate was submitted to vapor phase chromatographic analysis. The main fraction was submitted to short-path distillation at 35°-40°C. (0.05 mm.) to give trans-1-bromo-3,7-dimethylocta-3,7-diene as a colorless liquid, $n_D^{20}$ 1.4940.

Anal. Calcd. for $C_{10}H_{17}Br$: C, 55.32; H, 7.88; Br, 36.80.

Found: C, 55.5; H, 7.85; Br, 36.6.

EXAMPLE 10 trans-3-Methylocta-3,7-dien-1-ol [III; R is H, X is OH]

A mixture of 1.18 g. of the trans-1-bromo-3-methylocta-3,7-diene (Example 8) and 2.3 g. of anhydrous potassium acetate in 30 ml. of anhydrous dimethylformamide was stirred under nitrogen at 100°C. for 22 hr. The mixture was cooled, water and pentane were added, and the aqueous layer was extracted with pentane. The combined organic layers were washed with water followed by saturated brine, and dried over anhydrous sodium sulfate. Most of the solvent was removed by distillation through a 15 in. Podbielniak-type column. The residue containing trans-3-methylocta-3,7-dien-1-ol acetate [III; R is H, X is $OCOCH_3$] was diluted with 5-10 ml. of anhydrous ether, and 0.27 g. of lithium aluminum hydride was then added. The mixture was heated at reflux for 30 min., cooled to 25°C., treated with 0.27 ml. of water followed by 0.27 ml. of 15 percent sodium hydroxide, then with an additional 0.8 ml. of water. The resulting mixture was stirred for 10 min., dried over anhydrous magnesium sulfate, and filtered. The residue obtained on evaporation of the solvent from the combined filtrate and washings amounted to 0.71 g. of a colorless liquid, which was chromatographed on 35 g. of acid-washed alumina. The fraction eluted with 50 percent ether in pentane was submitted to short-path distillation at 125°C. (26 mm.) to give 0.555 g. (68 percent yield) of trans-3-methylocta-3,7-dien-1-ol as a colorless sweet-smelling liquid.

Anal. Calcd. for $C_9H_{16}O$: C, 77.09; H, 11.50.
Found: C, 77.2; H, 11.6.

EXAMPLE 11 trans-3,7-Dimethylocta-3,7-dienol [III; R is $CH_3$, X is OH]

A solution of 0.705 g. of trans-1-bromo-3,7-dimethyl-octa-3,7-diene (Example 9) in 16.6 ml. of dimethylformamide was treated with 1.33 g. of potassium acetate just as described above (Example 10) for the lower homolog. The crude acetate [III; R is $CH_3$, X is $OCOCH_3$] which amounted to 0.576 g. of pale yellow oil, was dissolved in 60 ml. of anhydrous methanol, 2.16 g. of anhydrous potassium carbonate was added, and the mixture was stirred for 1.5 hr. at 25°C. Most of the methanol was evaporated under reduced pressure, water was added to the residue, and the mixture was extracted with ether. The combined organic solutions were washed with water followed by saturated brine and were dried over anhydrous magnesium sulfate. The crude pale yellow oil obtained on evaporation of the solvent at reduced pressure was chromatographed on 29 g. of acid-washed alumina. The fraction eluted with 50 percent ether in pentane was submitted to short-path distillation at 122°-123°C. (17 mm.) to give 0.334 g. of trans-3,7-dimethylocta-3,7-dienol as a colorless liquid, $n_D^{25}$ 1.4680.

Anal. Calcd. for $C_{10}H_{18}O$: C, 77.86; H, 11.76.
Found: C, 78.0; H, 11.8.

EXAMPLE 12 trans-3,7-Dimethylocta-3,7-dienol p-toluenesulfonate [III; R is $CH_3$, X is $4-CH_3C_6H_4SO_3$]

To a solution of trans-3,7-dimethylocta-3,7-dienol (Example 11) (11.4 g., 74.0 mmoles) in 250 ml. of dry pyridine at 0°C. under nitrogen was added p-toluenesulfonyl chloride (23.8 g., 125 mmoles) in one portion. The solution was degassed with nitrogen and stirred at 0°-5°C. for 15 hr. Then 10 ml. of water was added cautiously, followed by 75 ml. of water in one portion. The solution was washed with 3 × 100 ml. portions of ether and the combined ether solutions were washed with 10 percent aqueous lactic acid until the aqueous layer remained acidic. The organic solution was then washed with saturates aqueous sodium bicarbonate solution, dried over anhydrous magnesium sulfate, and concentrated in vacuo to give 22.71 g. of trans-3,7-dimethyl-octa-3,7-dienol p-toluenesulfonate as a faintly yellow liquid.

According to the foregoing procedure trans-3-methyl-octa-3,7-dien-1-ol can be interacted with p-toluenesulfonyl chloride to give trans-3-methylocta-3,7-dien-1-ol p-toluene-sulfonate [III; R is H, X is $4-CH_3C_6H_4SO_3$].

EXAMPLE 13 a. 4-Benzyloxy-1-butyne

To a stirred slurry of sodium hydride (54.7 percent NaH by weight dispersion with mineral oil, 15.1 g., 0.63 mole) and 750 ml. of tetrahydrofuran (freshly distilled from lithium aluminum hydride) under nitrogen at 0°C. as added dropwise 4-hydroxy-1-butyne (46.0 g., 0.657 mole). The solution was stirred at 25°C. for 2.5 hr., cooled to 0°C, and α-bromotoluene (redistilled, 108 g., 0.622 mole) in 60 ml. of tetrahydrofuran was added over 1.0 hr. The mixture was stirred at 25°C. for 44 hr., then 125 ml. of water was added and the aqueous layer was washed with ether. The combined organic layers were washed with saturated aqueous salt solution, dried over anhydrous magnesium sulfate, and distilled at atmospheric pressure through an 8" Vigreux column to remove tetrahydrofuran. The desired 4-benzyloxy-1-butyne was obtained as a colorless oil, b.p. 117°–117.5°C. (30 mm.), 89.3 g.

b. 1-Benzyloxy-7,11-dimethyl-trans-dodeca-3-yne-7,11-diene [IV; R is $CH_3$]

To a flame-dried flask containing 150 ml. of ether and 19.5 g. (0.120 mole) of 4-benzyloxy-1-butyne under nitrogen at 0°C. was added a solution of methyllithium in ether (72.4 ml. of 1.62M solution, 0.117 mole). Addition was complete in 20 min. and the solution was stirred at 24°C. for 3 hr. Then the ether was removed by distillation at aspirator pressure and replaced with tetrahydrofuran (freshly distilled from lithium aluminum hydride, 300 ml.). The acetylide dissolved immediately to give a faintly yellow solution which was transferred to an addition funnel positioned over a mixture of trans-3,7-dimethylocta-3,7-dienol p-toluenesulfonate (Example 12) (22.7 g., 0.0772 moles) in 50 ml. of tetrahydrofuran under nitrogen at 24°C. About 200 ml. of the acetylide solution was added and the mixture was heated at reflux. Additional portions (25–35 ml.) of acetylide solution were added at 20–24 hr. intervals (three times). After 94 hr. at reflux, the solution (heterogeneous) was cooled and poured into 200 ml. of saturated aqueous sodium chloride solution. The aqueous solution was washed with 2 × 300 ml. portions of ether; the combined ether layers were dried over anhydrous magnesium sulfate, filtered, and concentrated at reduced pressure to leave a yellow liquid residue (ca 40 g.). Rapid column chromatography (200 g. anhydrous magnesium silicate) gave the desired product, eluted with pentane. The latter product was distilled without a fractionating column to afford a colorless liquid, b.p. 150°C./3 $\mu$. Final purification via careful short-path distillation gave 10.18 g. of 1-benzyloxy-7,11-dimethyl-trans-dodeca-3-yne-7,11-diene, shown to be 99 percent pure by vpc.

According to the foregoing procedure, trans-3-methyl-octa-3,7-dien-1-ol p-toluenesulfonate can be interacted with 4-benzyloxy-1-butyne in the presence of methyllithium to give 1-benzyloxy-7-methyl-trans-dodeca-3-yne-7,11-diene [IV; R is H].

EXAMPLE 14

7,11-Dimethyl-trans,trans-dodeca-3,7,11-trienol [V; R is $CH_3$, X is OH]

A solution of sodium (3.91 g., 0.17 mole) in 380 ml. of liquid ammonia was prepared under nitrogen. Then a solution of 1-benzyloxy-7,11-dimethyl-trans-dodeca-3-yne-7,11-diene [Example 13, part (b)] (10.0 g., 0.0354 mole) in 100 ml. of anhydrous ether was added over 15 min. via syringe. After 7 hr., excess ammonium chloride was added and the ammonia was allowed to evaporate. The residue salts were dissolved in 100 ml. of water, the ether layer was separated and the water layer was washed with 2 × 100 ml. portions of ether. After the combined ether extracts were dried over magnesium sulfate, and concentrated in vacuo, the yellow, cloudy residue was short-path distilled at 120°C./3 $\mu$ to afford 4.912 g. of 7,11-dimethyl-trans,trans-dodeca-3,7,11-trienol as a colorless, clear liquid. Thin layer chromatography (silica gel, ether eluant) showed only one component of $R_f$ 0.85. Nmr spectral integration of the vinyl protons indicated >90 percent all trans with exo methylene.

According to the foregoing procedure, 1-benzyloxy-7-methyl-trans-dodeca-3-yne-7,11-diene can be interacted with sodium in liquid ammonia to give 7-methyl-trans,trans-dodeca-3,7,11-trienol [V; R is H, X is OH].

EXAMPLE 15

7,11-Dimethyl-trans,trans-dodeca-3,7,11-trienyl bromide [V; R is $CH_3$, X is Br]

p-Toluenesulfonyl chloride (7.62 g., 0.040 mole) was added in one portion to a mixture of 7,11-dimethyl-trans,trans-dodeca-3,7,11-trienol (2.736 g., 13.1 mmoles) in 120 ml. of dry pyridine at 0°C. The solution was degassed with nitrogen and allowed to stir at 0°–5°C. for 18 hr. Then water (ca 10 ml.) was added dropwise over 10 min. with stirring and cooling. More water (100 ml.) was added in one portion and the aqueous layer was washed with 3 × 100 ml. portions of ether. The combined ether extracts were washed with 10 percent lactic acid until the wash liquid remained acidic and then with 10 percent aqueous sodium bicarbonate. The ether solution was dried over anhydrous magnesium sulfate, filtered, and concentrated at reduced pressure to give 8.841 g. of 7,11-dimethyl-trans,trans-dodeca-3,7,11-trienol p-toluenesulfonate [V; R is $CH_3$, X is 4-$CH_3C_6H_4SO_3$] as a faintly yellow liquid, which could be purified by chromatography on activated magnesium silicate and eluting with ether.

Lithium bromide (anhydrous, 13.5 g., 0.155 mole) was dried at 100°C./0.05 mm. for 6 hr., then added in one portion to a solution of 7,11-dimethyl-trans,trans-dodeca-3,7,11-trienol p-toluenesulfonate (4.201 g., 11.6 mmoles) in 110 ml. of acetone. The homogeneous mixture was degassed with nitrogen, and stirred at 24°C. for 18 hr. while protected from light with aluminum foil. The acetone was removed by distillation at reduced pressure and the residue was partitioned between 100 ml. of water and 100 ml. of ether. The water layer was washed with ether and the combined ether solutions were dried over magnesium sulfate, filtered, and concentrated in vacuo to give 3.352 g. of 7,11-dimethyl-trans,trans-dodeca-3,7,11-trienyl bromide as a faintly yellow liquid.

According to the foregoing procedure, 7-methyl-trans,trans-dodeca-3,7,11-trienol can be converted to its p-toluenesulfonate ester [V; R is H, X is 4-$CH_3C_6H_4SO_3$] and the latter interacted with lithium bromide to give 7-methyl-trans,trans-dodeca-3,7,11-trienyl bromide [V; R is H, X is Br].

EXAMPLE 16 a. 2,2-Ethylenedioxy-5-hexanone

A mixture of 2,5-hexanedione (37.0 g.), ethylene glycol (21.0 g.), p-toluenesulfonic acid monohydrate (0.165 g.) and 40 ml. of benzene was heated under reflux for 2 hr. with a Dean-Stark trap employed to collect the water that formed (7 ml.). The mixture was cooled to 25°C., and was stirred with 10 ml. of methanol and 25 ml. of 10 percent potassium hydroxide for 1 hr. The aqueous layer was separated and extracted with benzene, and the combined organic layers were washed with water, dried over anhydrous potassium carbonate, and concentrated at reduced pressure. The residue was repeatedly fractionated by spinning-band distillation with a center cut of b.p. 105°–108°C. (31 mm.) being retained, to give 15.2 g. of 2,2-ethylenedioxy-5-hexanone, $n_D^{26}$ 1.4390.

Anal. Calcd. for $C_8H_{14}O_3$: C, 60.73; H, 8.92.
Found: C, 60.6; H, 8.8.

By replacing the ethylene glycol in the foregoing preparation by propylene glycol there can be obtained 2,2-propylenedioxy-5-hexanone.

b. Ethyl 6,6-ethylenedioxy-3-oxoheptanoate [VI; R' is $C_2H_5$, n is 2]

Sodium hydride (16.63 g. of a 52 percent dispersion in mineral oil, 0.371 mole) was washed under nitrogen with pentane and then suspended in 45 ml. of ether. Diethyl carbonate (44.81 g., 0.378 mole) was added, and the mixture was warmed in an oil bath at 50°C. The 2,2-ethylenedioxy-5-hexanone (27.23 g., 0.172 mole) from part (a) above in 45 ml. of ether was then added dropwise over 1.33 hr. After 20 ml. of ether was added, the stirring and heating were continued for an additional 2.5 hr., followed by 13 hr. at room temperature, and another 4.5 hr. at 50°C. To the cooled (0°C.) mixture were then added 100 ml. of ether and a solution of 20 ml. of acetic acid in 80 ml. of water. The excess acetic acid was quickly neutralized with aqueous sodium bicarbonate, and the aqueous layer was separated and washed with ether. The ether extracts were combined and washed with successive portions of sodium bicarbonate solution and water, dried over magnesium sulfate, and concentrated at reduced pressure to give 39.5 g. of residue consisting of an almost equimolar mixture of ethyl 6,6-ethylenedioxy-3-oxoheptanoate and an isomer, ethyl 2-acetyl-4,4-ethylenedioxypentanoate. Repeated column chromatography (three times on 400 g. of activated magnesium silicate each time) partially separated the isomers. Ethyl 2-acetyl-4,4-ethylenedioxypentanoate was eluted first with 20 percent pentane in ether followed by a mixture of the isomers, and finally pure ethyl 6,6-ethylenedioxy-3-oxoheptanoate was eluted by the same solvent. In this way 12.7 g. (40 percent yield) of pure ethyl 6,6-ethylenedioxy-3-oxoheptanoate was obtained, $n_D^{25}$ 1.4513.

Anal. Calcd. for $C_{11}H_{18}O_5$: C, 57.35; H, 7.88.
Found: C, 57.3; H, 7.8.

By an analogous procedure, 2,2-propylenedioxy-5-hexanone can be interacted with diethyl carbonate to give ethyl 6,6-propylenedioxy-3-oxoheptanoate [VI; R' is $C_2H_5$, n is 3].

EXAMPLE 17

6-Carbethoxy-13,17-dimethyl-2,2-ethylenedioxy-5-oxo-trans,trans-octadeca-9,13,17-triene [VII; R is $CH_3$, Y' is

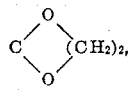

Z is $COOC_2H_5$]

Sodium hydride (1.244 g. of a 52 percent dispersion in mineral oil, 0.0264 mole) was washed under nitrogen with pentane to remove the mineral oil, and then dried in a stream of dry nitrogen. A mixture of N,N-dimethylformamide and benzene (4:1, 90 ml.) was added, and the suspension was stirred at 0°–5°C. under nitrogen. Ethyl 6,6-ethylenedioxy-3-oxoheptanoate (Example 16b) (6.076 g., 0.0264 mole) was added over 15 min. via syringe, and the syringe was rinsed with 5 ml. of the solvent mixture. The mixture was kept 20 min. at 0°–5°C., and then 7,11-dimethyl-trans,trans-dodeca-3,7,11-trienyl bromide (Example 15) (2.489 g., 0.0918 mole) was added over 15 min. The mixture was stirred for 15 min. at 25°C., and then warmed in an oil bath at 51°C. for 22 hr. Ether was then added, the mixture was cooled to −20°C. and a solution of 3 ml. of acetic acid in 10 ml. of water was added at −10°C. After the mixture was stirred for a few seconds, the excess acid was immediately neutralized with sodium bicarbonate solution. The aqueous layer was separated, washed with ether, and the combined ether layers were washed with successive portions of sodium bicarbonate solution and water. The solution was dried over magnesium sulfate, and distilled in vacuo to give 8.1485 g. of residue. Column chromatography with 500 g. of activated magnesium silicate and 30 percent ether in pentane as eluant gave 2.8177 g. (73 percent yield) of 6-carbethoxy-13,17-dimethyl-2,2-ethylenedioxy-5-keto-trans,trans-octadeca-9,13,17-triene, $n_D^{24}$ 1.4793. Elution with ether afforded 3.504 g. of unreacted keto ester.

Anal. Calcd. for $C_{25}H_{40}O_5$: C, 71.40; H, 9.59.
Found: C, 71.7; H, 9.6.

According to the foregoing procedure, ethyl 6,6-ethylenedioxy-3-oxoheptanoate can be interacted with 7-methyl-trans,trans-dodeca-3,7,11-trienyl bromide in the presence of sodium hydride to give 6-carbethoxy-13-methyl-2,2-ethylenedioxy-5-keto-trans,trans-octadeca-9,13,17-triene [VII; R is H, Y' is

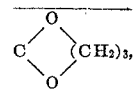

Z is $COOC_2H_5$].

Similarly, ethyl 6,6-propylenedioxy-3-oxoheptanoate can be interacted with 7,11-dimethyl-trans,trans-dodeca-3,7,11-trienyl bromide to give 6-carbethoxy-13,17-dimethyl-2,2-propylenedioxy-5-oxo-trans,trans-octadeca-9,13,17-triene [VII; R is $CH_3$, Y' is

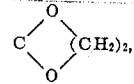

Z is $COOC_2H_5$].

EXAMPLE 18

13,17-Dimethyl-2,2-ethylenedioxy-5-oxo-trans,trans-octadeca-9,13,17-triene [VII; R is $CH_3$, Y' is

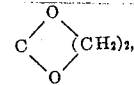

Z is H]

6-Carbethoxy-13,17-dimethyl-2,2-ethylenedioxy-5-oxo-trans,trans-octadeca-9,13,17-triene (Example 17) (2.702 g.) was dissolved in 4.2 ml. of ethanol; 5.65 g. of barium hydroxide octahydrate and 15.4 ml. of water were added. The mixture was degassed and stirred under nitrogen in an oil bath at 115°C. for 16 hr. With the solution at 0°C., ether was added, followed by a solution of 4 ml. of hydrochloric acid in 36 ml. of water. The excess acid was immediately neutralized and the solution filtered. The aqueous layer was separated and washed with ether. The ether extracts were combined and washed with successive portions of sodium bicarbonate solution and water, and then dried over magnesium sulfate. The solvent was removed by rotary evaporation to leave 1.8849 g. of residue which was chromatographed on 70 g. of activated magnesium silicate (10 percent ether in pentane as eluant), to give 1.3981 g. of 13,17-dimethyl-2,2-ethylenedioxy-5-oxo-trans,-trans-octadeca-9,13,17-triene, $n_D^{27}$ 1.4798.

Anal. Calcd. for $C_{22}H_{36}O_3$: C, 75.82; H, 10.42.
Found: C, 75.8; H, 10.4.

According to the foregoing procedures, 6carbethoxy-13-methyl-2,2-ethylenedioxy-5-oxo-trans,trans-octadeca-9,13,17-triene or 6-carbethoxy-13,17-dimethyl-2,2-propylenedioxy-5-oxo-trans,trans-octadeca-9,13,17-triene can be hydrolyzed with barium hydroxide to give 13-methyl-2,2-ethylenedioxy-5oxo-trans,trans-octadeca-9,13,17-triene [VII; R is H, Y' is

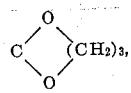

Z is H], or 13,17-dimethyl-2,2-propylenedioxy-5-oxo-trans,trans-octadeca-9,13,17-triene [VII; R is $CH_3$, Y' is

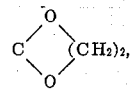

Z is H], respectively.

EXAMPLE 19

13,17-Dimethyl-2,5-dioxo-trans,trans-octadca-9,13,17-triene [VII; R is $CH_3$, Y' is C=O, Z is H]

A solution of 13,17-dimethyl-2,2-ethylenedioxy-5-oxo-trans,trans-octadeca 9,13,17-triene (Example 18) (0.3091 g.) and 15 ml. of 0.1N hydrochloric acid in 60 ml. of methanol was stirred under nitrogen for 1 hr. at 30°–33°C. and for 3 hr. at 33°–34.5°C. The acid was neutralized by addition of excess solid calcium carbonate, the solid was filtered, and the methanol was distilled at aspirator pressure. The residue was repeatedly extracted with ether, and the extracts were washed with successive portions of sodium bicarbonate solution and water. The solution was dried over anhydrous magnesium sulfate, and the solvent was removed at reduced pressure to give a yellow liquid, 0.2727 g., which was distilled to give 13,17-dimethyl-2,5-dioxo-trans,trans-octadeca-9,13,17-triene, $n_D^{26}$ 1.4779.

Anal. Calcd. for $C_{20}H_{32}O_2$: C, 78.89; H, 10.60.
Found: C, 78.83; H, 10.53.

According to the foregoing procedure, 13-methyl 2,-2-ethylenedioxy-5-oxo-trans,trans-octadeca-9,13,17-triene can be treated with methanolic hydrochloric acid to give 13-methyl-2,5-dioxo-trans,trans-octadeca-9,13,17-triene [VII; R is H, Y' is C=O, Z is H].

Alternatively, 13,17-dimethyl-2,5-dioxo-trans,trans-octadeca-9,13,17-triene can be prepared by treating 6-carbethoxy-13,17-dimethyl-2,2-ethylenedioxy-5-oxo-trans,trans-octadeca-9,13,17-triene (Example 17) with hydrochloric acid in methanol according to the procedure of Example 19 to cleave the ketal and obtain 6-carbethoxy-3,17-dimethyl-2,5-dioxo-trans,trans-octadeca-9,13,17-triene [VII; R is $CH_3$, Y' is C=O, Z is $COOC_2H_5$], and the latter hydrolyzed with barium hydroxide according to the procedure of Example 18.

EXAMPLE 20

2-(7,11-Dimethyl-trans,trans-dodeca-3,7,11-trienyl)-3-methyl-cyclopent-2-en-1-one [VIII; R is $CH_3$, Y'' is C=O]

13,17-Dimethyl-2,5-dioxo-trans,trans-octadeca-9,13,17-triene (Example 19) (0.1290 g.) in 15 ml. of 2 percent sodium hydroxide and 5 ml. of ethanol was stirred under nitrogen at 105°–110°C. for 6 hr., then neutralized with 0.5N hydrochloric acid and extracted with ether. The ether solution was washed with successive portions of sodium bicarbonate solution and water, dried over magnesium sulfate, and concentrated at reduced pressure to give 0.1218 g. of product. The combined products from two such reactions were purified by preparative thick layer chromatography ($CF_{254}$ silica gel) and developed for 1.5 hr. with 25 percent ether in pentane as eluant. The fastest moving uv-active component was collected by ether washing and shown to be 2-(7,11-dimethyl-trans,trans-dodeca-3,7,11-trienyl)-3-methylcyclopent-2-en-1-one by ir, uv, and nmr spectroscopy, obtained in 84 percent yield.

Anal. Calcd. or $C_{20}H_{30}O$: C, 83.88; H, 10.56.
Found: C, 83.16; H, 10.66.

According to the foregoing procedure, 13methyl-2,5-dioxo-trans,trans-octadeca-9,13,17-triene can be treated with dilute solium hydroxide to give 2-(7-methyl-trans,trans-dodeca-3,7,11-trienyl)-3-methylcyclopent-2-en-1-one [VIII; R is H, Y'' is C=O].

EXAMPLE 21

2-(7,11-Dimethyl-trans,trans-dodeca-3,7,11-trienyl)-1,3-dimethylcyclopent-2-en-1-ol [VIII; R is $CH_3$, Y'' is $C(OH)(CH_3)$]

To a solution of 2-(7,11-dimethyl-trans,trans-dodeca-3,7,11-trienyl)-3-methylcyclopent-2-en-1-one (Example 20) (206 mg., 0.721 mmole) in 10 ml. of anhydrous ether at 24°C. under nitrogen was added a solution of methyllithium in ether (prepared from lithium and methyl iodide, 2.0 ml. of 1.5M solution, 3.0 mmoles). The mixture was kept for 30 min. at 24°C. Water (0.054 ml., 3.0 mmoles) was added in one portion via syringe and the solution was stirred for 10 min. to decompose the excess methyllithium. Then another portion of methyllithium (2.0 ml., 3.0 mmoles) was added and allowed to react for 30 min. at 24°C. The mixture was then poured into 20 ml. of cold water and diluted with 10 ml. of ether. The organic layer was separated, washed with 20 ml. of saturated aqueous salt solution, dried over anhydrous magnesium sulfate, and concentrated by rotary evaporation to afford 217 mg. of 2-(7,11-dimethyl-trans,trans-dodeca-3,7,11-trienyl)-1,3-dimethylcyclopent-2-en-1-ol as a slightly yellow liquid, 217 mg.; infrared spectrum: 3700–3400 w (—OH), 1710 vw (C=O), 1600 m (C=C), 974 s (trans-HD=CH), 894 $cm^{-1}$ s (C=$CH_2$).

According to the following procedure, 2-(7-methyl-trans,trans-dodeca-3,7,11-trienyl-3-methylcyclopent-2-en-1-one can be treated with methyllithium to give 2-(7-methyl-trans,trans-dodeca-3,7,11-trienyl-1,3-dimethylcyclopent-2-en-1-ol [VIII; R is H, Y'' is $C(OH)(CH_3)$].

EXAMPLE 22 dl-3,17-Dimethyl-A-nor-D-homoandrosta-3,16-diene [IX; R is $CH_3$]

2-(7,11-Dimethyl-trans,trans-dodeca-3,7,11- trienyl)-1,3-dimethylcyclopent-2-en-1-ol (Example 21) (217 mg., 0.721 mmole) was dissolved in dichloromethane (freshly dried), flushed with nitrogen by alternately evacuating and filling, cooled to −78°C. (solid carbon dioxide-acetone bath), and stirred with a magnetic stirring bar. Then anhydrous trifluoroacetic acid (distilled from phosphorus pentoxide, sotred in a desiccator containing calcium chloride, 5.0 ml.) was added dropwise over three min. via syringe. A larger portion of the acid appeared in solid suspension and an oragne color developed within minutes. This mixture was kept 24.5 hr. aat −78°C., and then poured into a large beaker containing 100 ml. of saturated aqueous sodium bicarbonate solution. The mixture was stirred until the ice melted, then the aqueous layer was separated and washed with dichloromethane (2 × portions). The combined organic layers were dried over anhydrous magnesium sulfate and concentrated by rotary evaporation to afford a yellow liquid, 231 mg. Thin layer chromatography showed two spots ($R_f$ 0.71 and 0.63, pentane on silica gel) in addition to several unresolved components of low $R_f$. The infrared spectrum of the crude cyclization product ($CHCl_3$) indicated the presence of trifluoroacetate (1730 $cm^{-1}$), with small peaks at 970 $cm^{-1}$ (internal trans double bond) and 890 $cm^{-1}$ (terminal methylene).

The crude cyclization product was stirred in anhydrous ether (10 ml.) at 24°C. and solid lithium aluminum hydride (70 mg., 1.84 mmoles, ca tenfold excess) was added all at once. After 30 min., successive portions of water (70 $\mu$l.), 15 percent aqueous sodium hydroxide solution (70 $\mu$l.), and water (210 $\mu$l.) were added cautiously at a rate to avoid excessive bubbling. The mixture was stirred until the suspension was uniformly white (ca 10 min.) and then filtered. The residue was washed with 20 ml. of ether and the combined filtrate and wash solutions were concentrated by rotary evaporation to afford a colorless liquid (204 mg.). Infrared spectral analysis ($CHCl_3$) indicated the absence of trifluoroacetate and the presence of hydroxyl (3500 $cm^{-1}$). Rapid chromatography (2.0 g. of activated magnesium silicate) gave 67 mg. of a hydrocarbon fraction eluted with pentane and 140 mg. of an alcohol fraction eluted with ether.

The hydrocarbon fraction was distilled (short-path, 120°C. bath, 3 microns) to afford 52 mg. of colorless, crystalline distillated. Tlc analysis detected a major component of $R_f$ 0.71 (pentane on silica gel) and a trace constitutent at $R_f$ 0.63. Vpc analysis (5'5% SE 30 on chromosorb W, 170°C., $N_2$ carrier gas) gave a minor peak (16.5 min., relative area 0.04) and a major peak (21.2 min., area 0.96). Preparative tlc gave dl-3,17-dimethyl-A-nor-D-homoandrosta-3,16-diene (>99 percent pure by vpc, m.p. 61°–64°C., colorless blades from methanol). Nmr spectral analysis ($CCl_4$) was entriely consistent with the assigned structure (angular methyls at 0.78 and 0.88 $\delta$; vinyl methyl at 1.57 $\delta$; vinyl hydrogen at 5.33 $\delta$). The infrared spectrum ($CCl_4$) indicated the absence of terminal methylene absorption (expected at 890 $cm^{-1}$).

Anal. Calcd. for $C_{21}H_{32}$: C, 88.7; H, 11.3.
Found: C, 88.5; H, 11.4.

The alcohol fraction consisting of dl-3,17-dimethyl-A-nor-D-homoandrost-3-en-17-ol [X; R is $CH_3$] was stirred with 0.2 ml. of freshly distilled phosphorus oxychloride in 2.0 ml. of dry pyridine at 24°C. under nitrogen for 16 hr. Then ether (10 ml.) and water (10 ml., cautiously) were added in that order, with the solution at 0°C. The aqueous layer was washed with 10 ml. of ether, and the combined ether layers were washed with 20 ml. of 10 percent aqueous hydrochloric acid, dried over magnesium sulfate, and concentrated by rotary evaporation to afford a yellow liquid. Rapid chromatography on 2.0 g. of activated magnesium silicate gave 58 mg. of a hydrocarbon fraction which was distilled as above to produce a colorless, crystalline distillate (49 mg.) containing dl-3,17-dimethyl-A-nor-D-homoandrosta-3,16-diene, purified by tlc separation as above. The over-all yield of dl-3,17-dimethyl-A-nor-D-homoandrosta-3,16-diene was 81 mg., 40 percent.

According to the foregoing procedure, 2-(7-methyl-trans,trans-dodeca-1,7,11-trienyl)-1,3-dimethylcyclopent-2-en-1-ol can be cyclized with trifluoroacetic acid to give dl-3-methyl-A-nor-D-homoandrosta-3,16-diene [IX; R is H].

EXAMPLE 23 dl-3,17-Dimethyl-A-nor-D-homoandrosta-3,16-diene [IX; R is $CH_3$]

2-(7,11-Dimethyl-trans,trans-dodeca-3,7,11-trienyl)-1,3-dimethylcyclopent-2-en-1-ol (Example 21) (22.1 mg.) was dissolved in 18 ml. of dry dichloromethane, flushed with nitrogen, cooled to −78°C. with stirring, nd treated with 75 mg. (0.29 mmole) of stannic chloride (in 1 ml. of dry dichloromethane). The resulting yellow solution was stirred for 1 hr. at −78°C. and quenched at this temperature with 200 $\mu$l. of dry pyridine to give a colorless solution which was poured onto 25 ml. of cold 1N HCl and 20 ml. of dichloromethane. The aqueous layer was extracted with two more 15-ml. portions of dichloromethane and the combined organic extracts were washed with saturated sodium bicarbonate solution, dried over anhydrous magnesium sulfate and concentrated under reduced presure to give 21.6 mg. of a pale yellow oil. A vpc chromatogram of this material on 5 percent SE 30 column had a major peak (tetracyclic material) representing 83 percent of the total area. This material was chromatographed on 2 g. of activated magnesium silicate to give 16.2 mg. of a colorless material which eluted with pentane and 4.1 mg. of a yellow material which eluted with ether. The panetane eluant, which partially crystallized upon standing, was further purified by preparative tlc on a 4 × 8 inches plate coated wtih 10 g. of silica gel using ether as the solvent. The major fraction was collected and extracted with ether to afford 11.0 mg. of dl-3,17-dimethyl-A-nor-D-homoandrosta-3,16-diene as a white waxy solid, m.p. 59°–66°C. The nmr spectrum ($CDCl_3$ solution) exhibited absorptions for the C-18 and C-19 angular mehyl groups at $\delta$ 0.80 and 0.89, respectively, and a vinyl proton at $\delta$ 5.33 consistent with the 16,17 double bond isomer.

In another run, 2-(7,11-dimethyl-trans,trans-dodeca-3,7,11-trienyl)-1,3-dimethylcyclopent-2-en-1-ol (580 mg.) was dissolved in 90 ml. of nitromethane, degassed and flushed with nitrogen several times, cooled in a Dry Ice-carbon tetrachloride bath (−23°C.), and treated via syringe with 1.78 g. (6.83 mmoles) of stannic chloride in 8 ml. of degassed nitromethane over a 3 min. period. The resulting yellow-orange mixture was stirred for 3 hrs. at −23°C., then quenched by the addition of 1.2 ml. of dry pyridine via syringe at this temperature to give a white mixture which was poured onto 150 ml. of cold 1N hydrochloric acid covered with 150 ml. of ether.

The aqueous layer was extracted with four 75 ml. portions of ether and the combined ether solutions were washed three times with saturated sodium bicarbonate solution (white suspension in aqueous layer) and dried over anhydrous magnesium sulfate. The solvent was removed under reduced pressure, first on a water aspirator and finally at 0.5 mm., to give 550 mg. of a yellow oil which was chromatographed on 18 g. of activated magnesium silicate. The major fraction (first 50 ml.) eluted with degassed pentane was concentrated under reduced pressure to give 357 mg. of a colorless oil which crystallized almost immediately to give dl-3,17-dimethyl-A-nor-D-homoandrosta-3,16-diene, m.p. 62-70°C.

EXAMPLE 24

1α-(3-Oxobutyl)-5β-formylmethyl-6α-(2-oxopropyl)-1α,6β-dimethyl-3,4,4αβ,5,6,7,8,8αα-octahydro-2(1H)-naphthalenone [XI; R is $CH_3$]

By Osmolation of Tetracyclic Diene. dl-3,17-Dimethyl-A-nor-D-homoandrosta-3,16-diene (Example 22) (32.6 mg., 0.115 mmole) was dissolved in 2.0 ml. of pyridine (distilled from calcium hydride, stored over barium oxide) and solid osmium tetroxide (63 mg., 0.245 mmole) was added all at once. The mixture (rapidly turning brown) was flushed with nitrogen and stirred at 24°C. for 48 hr. A brown solid appeared after about 4 hr. The pyridine was removed by rotary evaporation and the brown powder was dissolved in 2-3 ml. of dimethyl sulfoxide (distilled from calcium hydride) by warming on a steam bath. Hydrogen sulfide was bubbled into the brown homogeneous solution for 5.0 min., and the resulting mixture was shaken with 50 ml. of dichloromethane overlaid with 50 ml. of water. The resulting black suspension was filtered with suction and the nearly colorless filtrate separated into two layers. The aqueous layer was washed with three 30 ml. portions of dichloromethane, and the black residue was washed with 30 ml. of tetrahydrofuran (freshly distilled from lithium aluminum hydride). The combined organic solutions were dried with magnesium sulfate and concentrated by rotary evaporation, first at aspirator pressure and finally at oil pump vacuum to remove dimethyl sulfoxide. The residue was a yellow solid, 71 mg. Trituration with 2-3 ml. of ether gave a nearly colorless solution from which was isolated by evaporation the tetrol derivative, 48 mg.

A sample of crude tetrol derivative (ca 0.1 mole) was dissolved in 2.0 ml. of tetrahydrofuran (freshly distilled from lithium aluminum hydride) and stirred at 0°C. Lead tetraacetate (143 mg., 0.34 mmole) was added as a solid in portions over one min. A yellow solid began to form immediately. After 5 min., 30 ml. of dichloromethane was added and the solution was washed with 10 ml. of 3 percent aqueous hydrochloric acid followed by 10 ml. of 5 percent aqueous potassium carbonate. The organic layer was dried over magnesium sulfate and concentrated by rotary evaporation to leave 1α-(3-oxobutyl)-5β-formylmethyl-6α-(2-oxopropyl)-1α,6β-dimethyl-3,4,4αβ,5,6,7,8,8αα-octahydro-2(1H)-naphthalenone as a yellow oil, 45.7 mg.

According to the foregoing procedure, dl-3-methyl-A-nor-D-homoandrosta-3,16-diene [IX; R is H] can be cleaved by osmolation to give 1α-(3-oxobutyl)-5β,6α-di(formylmethyl)-1α,6β-dimethyl-3,4,aβ,5,6,7,8,8αα-octahydro-2(1H)-naphthalenone [XI; R is H].

EXAMPLE 25

1α-(3-Oxobutyl)-5β-formylmethyl-6α-(2-oxopropyl)-1α,6β-dimethyl-3,4,4αβ,5,6,7,8,8αα-octahydro-2(1H)-naphthalenone [XI; R is $CH_3$].

By Ozonolysis of Tetracyclic Diene IX

A solution of 12 mg. (0.042 mmole) of dl-3,17-dimethyl-A-nor-D-homoandrosta3,16-diene (Example 2), which had been evaporatively distilled at 120°-125°C. (3 μ), m.p. 59-67°C., in 2.0 ml. of dichloromethane and 0.5 ml. of pyridine was cooled with stirring to −78°C. and treated with ozone-oxygen until a blue color developed. The solution was stirred for another 15 min., treated with 80 mg. of zinc powder and 0.4 ml. of acetic acid, and allowed to warm to 0°C. The treatment with zinc and acetic acid was repeated after 15 min. and the solution was stirred at 0°C. for an additional 45 min. The zinc was removed by filtration affording a colorless filtrate which was diluted with 20 ml. of dichloromethane and washed twice with saturated sodium bicarbonate solution and once with saturated brine. The organic layer was dried with anhydrous magnesium sulfate and concentrated under reduced pressure to give 15.5 mg. of 1α-(3-oxobutyl)-5β-formylmethyl-6α-(2-oxopropyl)-1α,6β-dimethyl- 3,4,4αββ,5,6,7,8,8αα-octahydro-2(1H)-naphthalenone as a pale yellow oil, $\lambda_{max}^{CHCl_3}$ 3.67 (CHO, w) and 5.87 μ (C=O, s). TLC on silica gel showed a major spot of $R_f$ 0.12 upon development with ether and a faint spot of $R_f$ 0.33. This material was used immediately in the subsequent transformation without further purification.

According to the foregoing procedure, dl-3-methyl-A-nor-D-homoandrosta-3,16-diene [IX; R is H] can be ozonized to give 1α-(3-oxobutyl)-5β,6α-di(formylmethyl)-1α,6β-dimethyl-3,4,4αβ,5,6,7,8,8αα-octahydro-2(1H)-naphthalenone [XI; R is H].

EXAMPLE 26 dl-Pregna-4,16-diene-3,20-dione [XII; R is $CH_3$]

The solid crude triketoaldehyde from Example 24 (45.7 mg.) was stirred with 2.5 percent aqueous potassium hydroxide under nitrogen at 74°C. for 13 hr. The mixture became yellow with a brown solid. The solution was diluted with 10 ml. of 3 percent aqueous hydrochloric acid, and washed with four 10 ml. portions of dichloromethane. The combined organic extracts were dried over magnesium sulfate and concentrated by rotary evaporation to leave a yellow solid, 39 mg. Preparative tlc (1:1 pentane:ether, silica gel, continuous evaporation for one hr.) gave 5.0 mg. of dl-pregna-4,16-diene-3,20-dione ($R_f$ ca 0.35) which was estimated to be 80–90 percent pure by analytical tlc, and 11 mg. of a mixture running slightly slower. The 11 mg. mixture was re-plated as before with continuous evaporation for 3 hr. to provide clean separation of the 16-dehydroprogesterone fraction, 4.2 mg. with $R_f$ 0.45. Total yield of 16-dehydroprogesterone was 9.2 mg., 29 percent overall from the tetracyclic diene IX. Vpc analysis (5-ft. × ⅛-in., 5% SE 30 on chromosorb W at 255°C., $N_2$ carrier at 18 psi) gave one peak at 8.6 min., identical with commercial material. Similarly, the nmr ($CDCl_3$) and infrared ($CHCl_3$) spectral data for synthetic and commercial samples of 16-dehydroprogesterone were identical in every respect. Crystallization from benzene-hexane gave the analytical sample as prisms, m.p. 182°-186°C. The natural material (from benzene-hexane) had m.p. 182°–184°C.

Anal. Calcd. for $C_{20}H_{28}O_2$: C, 80.73; H, 9.03. Found: C, 80.54; H, 9.06.

According to the foregoing procedure, 1α-(3-oxobutyl)-5β,6α-di(formylmethyl)-1α,6β-dimethyl-3,4,4aβ, 5,6,7,8,8aα-octa-hydro-2(1H)-naphthalenone [XI; R is H] can be cyclized with potassium hydroxide to give dl-17-formylandrosta-4,16-diene-3,20-dione [XII; R is H].

EXAMPLE 27 dl-Pregna-4,16-diene-3,20-dione [XII; R is CH₃]

The ozonolysis product (15.5 mg.) from Example 25 was dissolved in 1.2 ml. of a solution made from 3.0 ml. of acetic acid, 0.3 ml. of concentrated hydrochloric acid, and 0.075 ml. of water, then refluxed under a nitrogen atmosphere for 2.5 hrs. The reaction mixture was concentrated under reduced pressure to give a brown residue which was taken up in 10 ml. of ether and washed with saturated sodium bicarbonate solution and brine. The organic solution was drived over anhydrous magnesium sulfate and concentrated under reduced pressure to give 8.9 mg. of a brown oil. This material was purified by preparative tlc on a 2 × 8 inch plate coated with silica gel and the major fraction, developed with ether, was collected and extracted with tetrahydrofuran to give 3.8 mg. of a pale yellow oil which solidified upon standing. This material was recrystallized twice from ether and once from benzene-hexane to give white plates (1.0 mg.) melting at 184°–187°C. This material upon admixture with the dl-pregna-4,16-diene-3,20-dione obtained in Example 26 (m.p. 182°– 186°C.) also melted at 184°–187°C.

dl-Pregna-4,16-diene-3,20-dione and dl-17-formyl-androsta-4,16-diene-3,20-dione can be resolved into their d-and l-forms by conversion to the respective hydrazone derivatives with l-menthylhydrazine, separation of the diastereoisomeric forms, and reconversion of the hydrazones to the respective optically active ketones. The resolutions can also be effected by stereoselective microbiological reduction, or by reduction with an optically active aluminum alkoxide, followed by oxidation of the resulting optically active steroid carbinols.

EXAMPLE 28

Ethyl 2-(3-butynyl)-6,6-ethylenedioxy-3-oxoheptanoate [XIII; n is 2, Y° is C=O, Z' is COOC₂H₅]

A solution of 75 g. (0.42 mole) of 4-iodo-1-butyne ($n_D^{20}$ = 1.5492) in 85 ml. of dry acetonitrile was degassed and flushed with nitrogen several times, then 35.6 g. (0.141 5 μmole) of ethyl sodio-6,6-ethylenedioxy-3-oxoheptanoate (Example 17) was added and the resulting yellow solution was again degassed and flushed with nitrogen. The solution was heated at 70°C. under nitrogen for 12 hr., the cooled and poured onto 500 ml. of ice-water and 1250 ml. of ether. The aqueous layer was extracted with ether (3 × 200 ml.) and the combined ether solutions were washed with brine and dried over anhydrous magnesium sulfate. The organic solution was concentrated first by atmospheric distillation through a Vigreux column followed by vacuum distillation through a microdistilling heat to give 25 g. of unchanged 4-iodo-1-butyne, b.p. 25°–45°C. (15 mm.) and 43.5 g. of a pale yellow distillation residue. The latter material was submitted to high vacuum distillation through a microdistilling head to give 7.88 g. of a colorless oil, b.p. 114°–117°C. (0.05 mm.) and a yellow distillation residue which was evaporatively distilled at 115°–120°C. (5 μ) to give 29.1 g. (7 percent yield) of ethyl 2-(3-butynyl)-6,6-ethylenedioxiy-3-oxoheptanoate as a colorless oil, $n_D^{20}$ = 1.4651.

EXAMPLE 29

9,9-Ethylenedioxy-6-oxo-1-decyne [XIII; n is 2, Y° is C=O, Z' is H]

A mixture of 28.2 g. (0.100 mole) of ethyl 2-(3-butynyl)-6,6-ethylenedioxy-3-oxoheptanoate (Example 28), $n_D^{20}$ = 1.4651, 70 ml. of absolute ethanol, and 245 ml. of distilled water was degassed and flushed with nitrogen several times. Barium hydroxide octahydrate (88 g., 0.28 mole) was then added and the resulting mixture was degassed again and heated under nitrogen for 16 hrs. at 95°–100°C. The reaction mixture was cooled, poured onto 200 g. of ice covered with 750 ml. of pentane, acidified with 370 ml. of 2N hydrochloric acid, swirled for 3 min., and made alkaline by the addition of sodium bicarbonate solution. The basic aqueous layer was extracted with pentane (3 × 400 ml.) and the combined organic solutions were washed with water and brine, then dried over anhydrous magnesium sulfate. The solvent was removed by atmospheric distillation through a Vigreux column to afford a residue which was evaporatively distilled at 90-100°C. (5 μ) to give 15.26 g. (73 percent yield) of 9,9-ethylenedioxy-6-oxo-1-decyne as a colorless oil.

EXAMPLE 30

6,9-bis-Ethylenedioxy-1-decyne [XIII; n is 2, Y° is

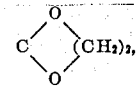

Z' is H]

A mixture of 15.2 g. (72 mmoles) of 9,9-ethylenedioxy-6-oxo-1-decyne (Example 29), 17.5 ml. (19.4 g., 312 mmoles) of ethylene glycol, 125 mg. (0.66 mmole) of p-toluenesulfonic acid monohydrate, and 500 ml. of benzene was degassed and flushed with nitrogen several times. The mixture was then boiled under reflux for 16 hrs. while the water was removed azeotropically with a Dean-Stark trap. After cooling, the reaction was quenched with 75 ml. of saturated sodium bicarbonate solution and the aqueous phase was extracted with two 40 ml. portions of benzene. The combined benzene solutions were washed with water, dried over anhydrous magnesium sulfate, and concentrated by atmospheric distillation to give 19 g. of a nearly colorless oil. This material was evaporatively distilled at 100°–105°C. (5 μ) to give 18.5 g. (100 percent yield) of 6,9-bis-ethylenedioxy-1-decyne as a colorless oil.

EXAMPLE 31 a. trans-1-Bromo-3,7-dimethylocta-3,7-diene [XIV; R is CH₃]

A mixture of 25.1 g. (0.144 mole) of o-phenylenephosphorochlorodite and 25 ml. of dry pyridine in 330 ml. of dry ether was cooled to 0°C. under nitorgen while 20.0 g. (0.130 mole) of 1-methylcyclopropyl-3- methyl-3-butenylcarbinol, $n_D^{22} = 1.4609$, in 60 ml. of dry ether was added over a 30 min. period. The white suspension was stirred 2.5 hrs. at room temperature, then filtered and washed with ether. The filtrate and washings were washed wtih cold water, 10 percent v/v lactic acid, saturated sodium bicarbonate solution, and brine, then dried over anhydrous magnesium sulfate. The solvent was removed under reduced pressure to give 42 g. of a colorless oil which was used immediately in the subsequent transformation.

A solution of the crude phosphite (42 g.) in 70 ml. of dry ether was added over 30 min. to a mixture of 58.5 g. (0.26 mole) of dry zinc bromide, 730 mg. of calcium oxide, and 580 ml. of dry ether. The resulting pale yellow mixture was stirred under nitrogen at room temperature for 38 hrs. and poured onto 400 ml. of ice-water covered with 500 ml. of pentane. The aqueous layer was extracted with two 200 ml. portions of pentane and the combined organic solutions were washed with water (twice) and saturated brine, then dried over anhydrous magnesium sulfate. The solvent was removed first by atmospheric distillation through a Vigreux column and finally under reduced pressure to give 31 g. of a nearly colorless oil which was chromatographed on 160 g. of activated magnesium silicate with pentane (500 ml.). The pentane was removed as described above to give 20.6 of trans-1-bromo-3,7-dimethylocta-3,7-diene as a colorless oil.

b.

13,17-Dimethyl-bis-2,5-ethylenedioxyoctadeca-trans-13,17-dien-9-yne [XV; Y and Y' are

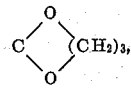

A is C C, R is $CH_3$].

A solution of 16.72 g. (65.7 mmoles) of 6,9-bis-ethylenedioxy-1-decyne (Example 30 ) in 130 ml. of dry ether was cooled to 0°C. while 85 ml. (70 mmoles) of 0.82M methyllithium in ether was added over 30 min. under a nitrogen atmosphere. The resulting white suspension was stirred for 5 min. at 0°C. and 30 min. at room temperature, then the ether was evaporated under a stream of dry, oxygen-free nitrogen. To the resulting white residue was added 200 ml. of dry tetrahydrofuran to give a nearly colorless solution which was treated with 14.3 g. (66 mmoles) of trans-1-bromo-3,7-dimethylocta-3,7-diene in 50 ml. of dry tetrahydrofuran over a 60 min. period. The resulting milky solution was boiled under reflux in a nitrogen atmosphere. An aliquot removed after 64 hrs. indicated the alkylation was about 60 percent complete, but that no dienic bromide was left. The mixture was cooled to −10°C. (after 70 hrs.) and treated with 27 ml. (22 mmoles) of 0.82M methyllithium in ether and allowed to warm to room temperature. A solution of 4.8 g. (22 mmoles) of the dienic bromide in 20 ml. of dry tetrahydrofuran was then added and the solution was stirred under a stream of nitrogen for 1 hr. to remove ether. The solution was refluxed for 36 additional hrs., then cooled and poured onto 400 ml. of ice-water covered with 300 ml. of ether. The aqueous layer was extracted with two 100 ml. portions of ether and the combined ether solutions were washed with water and brine, then dried over anhydrous magnesium sulfate. The solvent was removed under reduced pressure to give 35 g. of an orange oil which was further concentrated at 0.2 mm. to give 25 g. of an orange distillation residue. This material was further purified by evaporative disstillation until the tlc of the distillation residue (1:1 ether:-pentane) showed essentially one spot, $R_f$ 0.33. This material was further purified by column chromatography on 200 g. of activated magnesium silicate with degassed 1:1 ether:pentane to give 16.36 g. of 13,17-dimethyl-bis-2,5-ethylenedioxyoctadeca-trans-13,17-dien-9-yne as a colorless oil.

EXAMPLE 32

13,17-Dimethyl-bis-2,5-ethylenedioxy-trans,trans-octadeca-9,13,17triene [XV; Y and Y' are

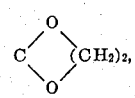

A is CH=CH, R is $CH_3$]

A solution of 15.50 g. (39.7 mmoles) of 13,17-dimethyl-bis-2,5-ethylenedioxyoctadeca-trans-13,17-dien-9-yne (Example 31) in 120 ml. of dry ether and 600 ml. of ammonia (distilled from sodium) was treated with 3.6 g. (0.16 g.-atom) of sodium and the resulting blue mixture was stirred under reflux in a nitrogen atmosphere for 2 hrs. The reaction was cautiously quenched with solid ammonium chloride to give a white mixture which was allowed to evaporate under a stream of nitrogen. The residue was partitioned between 500 ml. of ether and 100 ml. of water and the aqueous layer was extracted with two 100 ml. portions of ether. The combined either solutions were washed with brine and dried over magnesium sulfate. The solvent was removed under reduced pressure to give 15.54 g. (100 percent yield) of 13,17-dimethyl-bis-2,5-ethylenedioxy-trans,trans-octadeca-9,13,17-triene as a nearly colorless oil.

EXAMPLE 33

13,17-Dimethyl-2,5-dioxo-trans,trans-octadeca-9,13,17-triene [VII; Y' is C=O, Z is H, R is $CH_3$]

A mixture of 15.4 g. (39.2 mmoles) of 13,17-dimethyl-bis-2,5-ethylenedioxy-trans,trans-octadeca-9,13,17-triene (Example 32), 528 ml. of methanol, and 132 ml. of 0.1N hydro-chloric acid was degassed and flushed with nitrogen, then stirred under a nitrogen atmosphere at 35°C. for 6 hrs. The solution was made slighly basic with saturated sodium bicarbonate solution and concentrated on a rotary evaporator to give a milky mixture (300 ml.) which was extracted with five 150 ml. portions of ether. The combined ether extracts were washed with water and brine, dried over anhydrous magnesium sulfate, and concentrated under reduced pressure to give a cloudy oil which was evaporatively distilled at 130°–135°C. (5 μ) to give 11.37 g. of a colorless oil. The vpc chromatogram and nmr spectrum indicated the presence of considerable unhydrolyzed ketal (about 15 percent).

A mixture of 10.95 g. of the above distilled material, 500 ml. of methanol, and 125 ml. of 0.1N hydrochloric acid was degassed and heated under nitrogen for 3 hrs. at 35°C. The reaction was worked up as described above to afford a nearly colorless oil which was evaporatively distilled at 135°–140°C. (5 μ) to give 10.65 g. of 13,17-dimethyl-2,5-dioxo-trans,trans-octadeca- 9,13,17-triene as a colorless oil, identical with the compound obtained in Example 19.

I claim:
1. A compound of the formula

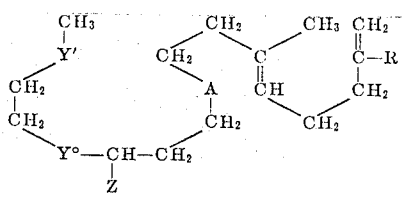

wherein R is hydrogen or methyl, Y' and Y° are C=O or

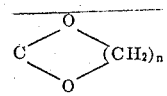

wherein n is 2 or 3, A is C≡C or CH=CH, and Z is hydrogen or carbo-lower-alkoxy.

2. The compound according to claim 1 wherein R is methyl, Y' is

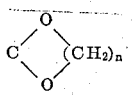

Y° is C=O, n is 2, A is CH=CH and Z is carbethoxy.

3. The compound according to claim 1 wherein R is methyl, Y' is

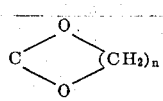

Y° is C=O, n is 2, A is CH=CH and Z is hydrogen.

4. The compound according to claim 1 wherein R is methyl, Y' and Y° are C=O, A is CH=CH and Z is hydrogen.

5. The compound according to claim 1 wherein R is methyl, Y' and Y° are

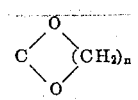

n is 2, A is C≡CH and Z is hydrogen.

6. The compound according to claim 1 wherein R is methyl, Y' and Y° are

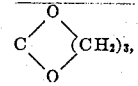

n is 2, A is CH=CH and Z is hydrogen.

* * * * *